United States Patent
Choi et al.

(10) Patent No.: US 9,823,461 B2
(45) Date of Patent: Nov. 21, 2017

(54) FLUID FOR ELECTROWETTING DEVICE AND ELECTROWETTING DEVICE INCLUDING SAME

(71) Applicants: SAMSUNG ELECTRONICS CO., LTD., Suwon-si (KR); SNU R&DB Foundation, Seoul (KR)

(72) Inventors: Chilsung Choi, Suwon-si (KR); Woohyuk Jang, Seoul (KR); Taekdong Chung, Gwacheon-si (KR)

(73) Assignees: SAMSUNG ELECTRONICS CO., LTD., Suwon-si (KR); SNU R&DB FOUNDATION, Seoul (KR)

( * ) Notice: Subject to any disclaimer, the term of this patent is extended or adjusted under 35 U.S.C. 154(b) by 207 days.

(21) Appl. No.: 14/694,187

(22) Filed: Apr. 23, 2015

(65) Prior Publication Data

US 2016/0124212 A1 May 5, 2016

(30) Foreign Application Priority Data

Oct. 29, 2014 (KR) ........................ 10-2014-0148445

(51) Int. Cl.
*H01B 1/12* (2006.01)
*G02B 26/00* (2006.01)

(52) U.S. Cl.
CPC .......... *G02B 26/005* (2013.01); *H01B 1/124* (2013.01)

(58) Field of Classification Search
CPC .............................. G02B 26/005; H01B 1/124
See application file for complete search history.

(56) References Cited

U.S. PATENT DOCUMENTS

| | | | | |
|---|---|---|---|---|
| 7,780,874 B2 | 8/2010 | Liogier D'Ardhuy et al. | | |
| 8,199,409 B2* | 6/2012 | Hayes | ................ | G02B 26/005 359/665 |
| 8,708,764 B2* | 4/2014 | Liang | ..................... | G02F 1/167 359/296 |
| 8,717,663 B2* | 5/2014 | Heikenfeld | .......... | G02B 26/005 252/586 |
| 8,730,154 B2* | 5/2014 | Dean | ..................... | G09G 3/344 345/107 |
| 8,854,739 B2* | 10/2014 | Kuiper | .................... | G02B 3/14 359/665 |

(Continued)

FOREIGN PATENT DOCUMENTS

| | | |
|---|---|---|
| CN | 103627014 A | 3/2014 |
| KR | 10-2012-0093260 A | 8/2012 |

(Continued)

OTHER PUBLICATIONS

Brown et al., "Chemistry: The Central Science, 9th ed.", http://wps.prenhall.com/wps/media/objects/165/169060/tool_g05.gif.*

(Continued)

*Primary Examiner* — Mark Kopec
*Assistant Examiner* — Jaison Thomas
(74) *Attorney, Agent, or Firm* — Sughrue Mion, PLLC

(57) ABSTRACT

Provided are a fluid for an electrowetting device including a first fluid as a polar liquid, and a second fluid, as a non-polar solution, which is separated from the first fluid by an interface, wherein the first fluid includes an organic acid having an acid dissociation constant (pKa) of about 4 or less, a polar solvent, and a quaternary ammonium hydroxide compound, and an electrowetting device including the fluid.

17 Claims, 8 Drawing Sheets

(56) References Cited

U.S. PATENT DOCUMENTS

| | | | |
|---|---|---|---|
| 9,494,790 B1* | 11/2016 | Massard | G02B 26/005 |
| 9,494,791 B1* | 11/2016 | Tauk | G02B 26/005 |
| 2010/0172999 A1* | 7/2010 | Marteaux | A45C 11/00 |
| | | | 424/490 |
| 2013/0109764 A1* | 5/2013 | Massard | B01F 17/0021 |
| | | | 516/203 |
| 2015/0338636 A1* | 11/2015 | Choi | G02B 26/005 |
| | | | 359/290 |
| 2016/0306166 A1* | 10/2016 | Araki | G03C 1/00 |

FOREIGN PATENT DOCUMENTS

| | | |
|---|---|---|
| KR | 10-2013-0097705 A | 9/2013 |
| WO | 2011/042835 A1 | 4/2011 |
| WO | 2011/157826 A1 | 12/2011 |

OTHER PUBLICATIONS

Z. Florjanczyk, et al., Proton conducting electrolytes based on poly(2-acrylamido-2-methyl-1-propanesulfonic acid), Electrochimica Acta, vol. 48, 2003, pp. 2201-2206.

J. Sun, et al., "Novel alkaline polymer electrolytes based on tetramethyl ammonium hydroxide", Electrochimica Acta, vol. 48, 2003, pp. 1971-1976.

Paul F. McManamon, et al, "A Review of Phased Array Steering for Narrow-Band Electrooptical Systems", Proceedings of the IEEE, vol. 97, No. 6, Jun. 2009, pp. 1078-1096.

Yongjoo Kwon et al; "Development of Micro Variable Optics Array"; MEMS; Jan. 26-30, 2014; pp. 72-75; 4 pgs. total.

\* cited by examiner

FLUID FOR ELECTROWETTING DEVICE AND ELECTROWETTING DEVICE INCLUDING SAME

RELATED APPLICATION

This application claims the benefit of Korean Patent Application No. 10-2014-0148445, filed on Oct. 29, 2014, in the Korean Intellectual Property Office, the disclosure of which is incorporated herein in its entirety by reference.

BACKGROUND

1. Field

The present disclosure relates to fluids for an electrowetting device and electrowetting devices including the same.

2. Description of the Related Art

Electrowetting is a phenomenon by which the contact angle of a liquid resting on a solid interface such as an electrode or a dielectric layer formed on the electrode, can be modulated by an applied voltage. Regardless of the sign of the voltage, the electric fields cause a change in the energy of the solid-liquid interface, which leads to a change in contact angle of the liquid. An electrowetting device can be used in an active optical element (AOE) for realizing a three-dimensional stereoscopic image. In the realization of the three-dimensional stereoscopic image, the electrowetting device may change a propagation path of light emitted from a light source to a spatial region of an observer located at a proper observation distance from the image.

For example, an electrowetting microprisms operate by modifying the physical geometry between two immiscible fluids. In the electrowetting microprisms, the propagation path of light may be modified by controlling a contact angle of the interface of the two fluids through changes in potential difference between the two fluids.

In the electrowetting device, the fluid layer may diffuse onto an electrode or dielectric layer due to a formation of a relatively high potential gradient at an interface between the fluid layer and the electrode or dielectric layer) the reliability of the electrowetting device may be reduced.

SUMMARY

Provided are fluids for an electrowetting device.

Provided are electrowetting devices having improved reliability by including the fluid for an electrowetting device.

Additional aspects will be set forth in part in the description which follows and, in part, will be apparent from the description, or may be learned by practice of the presented embodiments.

According to an aspect of the present disclosure, a fluid for an electrowetting device includes:

a first fluid as a polar liquid; and a second fluid, as a non-polar solution, which is separated from the first fluid by an interface, wherein the first fluid includes an organic acid having an acid dissociation constant (pKa) of about 4 or less, a polar solvent, and a quaternary ammonium hydroxide compound.

According to another aspect of the present disclosure, an electrowetting device includes: a first electrode and a second electrode separated from and facing to each other; a dielectric layer on the first electrode and the second electrode; and the above-described fluid for an electrowetting device which is disposed between the first electrode and the second electrode and is separated from the first electrode and the second electrode by the dielectric layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
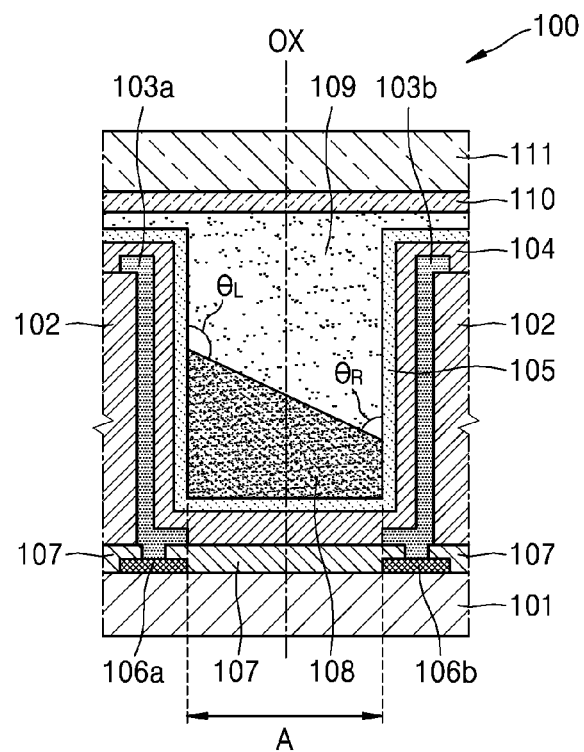
FIG. 1 is a cross-sectional view schematically illustrating a structure of a single electrowetting prism cell of an electrowetting device according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a fluid for an electrowetting device according to an embodiment of the present disclosure and an electrowetting device including the same will be described in more detail.

A fluid for an electrowetting device according to an embodiment of the present disclosure may include a first fluid as a polar liquid and a second fluid as a non-polar solution. The first liquid and the second liquid are separated from each other by an interface.

The expression "polar liquid" in the present specification denotes a material which may provide conduction properties to a fluid.

The first fluid includes an organic acid having an acid dissociation constant (pKa) of about 4 or less, a polar solvent, and a quaternary ammonium hydroxide compound.

In an electrowetting device used in an optical device, components of a first fluid layer (e.g., hydrogen ion, potassium ion and inorganic ion, or polyacrylic acetate (PAA) anion) at an interface between the fluid layer and an electrode or a dielectric layer diffuse into the electrode or the dielectric layer to cause penetration destruction of the electrode or the dielectric layer, causing a deterioration of a long-term stability of the electrowetting device.

Accordingly, according to an embodiment, a fluid for use in electrowetting devices are provided which is free from the penetration destruction of the electrode or dielectric layer by increasing the size of the cation and anion using a polar fluid which includes an organic acid having an acid dissociation constant (pKa) of about 4 or less, a quaternary ammonium hydroxide compound, and a polar solvent. An electrowetting device having the fluid has an improved long-term stability. Since the pKa of the above-described polar fluid is as low as about 4 or less, dissociation of hydrogen ions is relatively easily facilitated. Thus, electrical conductivity of the fluid may not only be improved, but also there is almost no absorption in the visible region of the light. Therefore, the polar fluid has high transmittance so as to transmit light almost without loss. Compared to an electrowetting device employing a typical polar fluid containing water, the electrowetting device using the fluid according to an embodiment of the subject disclosure shows a reduced corrosion of a substrate in the device, can operate at a broader range of operating temperature because the freezing point is lowered, and shows improved reliability.

The acid dissociation constant, for example, may be in a range of about 0.5 to about 3.

The organic acid having an acid dissociation constant (pKa) of about 4 or less, for example, may include at least one selected from the group consisting of a compound represented by the following Formula 1, polyvinylphosphonic acid, polymethacrylic acid (PMA), and polystyrene sulfonic acid (PSSA).

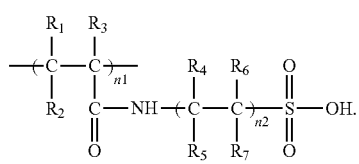

Formula 1

In Formula 1, $R_1$ to $R_7$ are, independently, a hydrogen atom, an unsubstituted or substituted C1-C20 alkyl group, or an unsubstituted or substituted C6-C20 aryl group, n1 is between 1 and 1,000, and n2 is between 1 and 4.

A polydispersity index (PDI) of the compound represented by Formula 1 is about 1 to about 100 as weight-average molecular weight (Mw)/number-average molecular weight (Mn).

$R_1$ to $R_7$, for example, may be independently a hydrogen atom, a methyl group, an ethyl group, a propyl group, and a butyl group.

The compound represented by Formula 1, for example, may be selected from the group consisting of poly(2-acrylamido-2-methyl-1-propane sulfonic acid) (PAMPSA) represented by the following Formula 1a, compounds represented by the following Formula 1b, or compounds represented by the following Formula 1c.

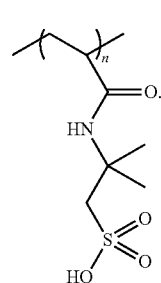

Formula 1a

In Formula 1a, n is between 1 and 1,000, for example, 1 and 10.

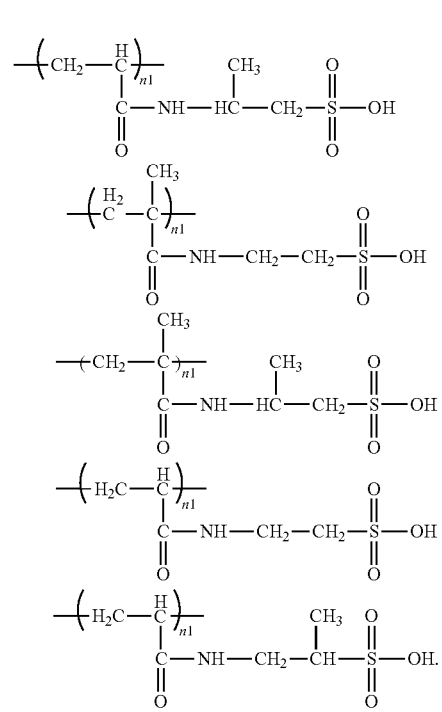

Formula 1b

In Formula 1b, n1 is between 1 and 1,000, for example, 1 and 10.

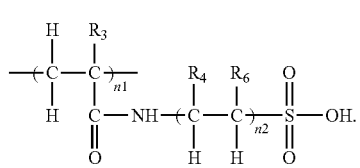

Formula 1c

In Formula 1c, n1 is between 1 and 1,000, for example, 10 and 100.

n2 is between 1 and 4, and $R_3$, $R_4$, and $R_6$ may be each independently H, $CH_3$, or $C_2H_5$.

A pKa of PAMPSA is about 1. Polyvinylphosphonic acid is a dibasic acid with pKa values of about 2 and about 8, respectively.

The above-described quaternary ammonium hydroxide compound, for example, may be a compound represented by Formula 2 below.

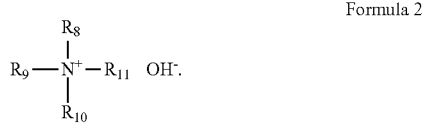

Formula 2

In Formula 2, at least one selected from $R_8$ to $R_{11}$ is an unsubstituted or substituted C1-C20 alkyl group, or an unsubstituted or substituted C6-C20 aryl group, and remaining $R_8$ to $R_{11}$ are independently hydrogen, an unsubstituted or substituted C1-C20 alkyl group, or an unsubstituted or substituted C6-C20 aryl group.

The quaternary ammonium hydroxide compound may include at least one selected from the group consisting of tetramethylammonium hydroxide represented by the following Formula 2a, tetraethylammonium hydroxide, choline hydroxide represented by the following Formula 2b, tetrabutylammonium hydroxide represented by the following Formula 2c, tetrabutylammonium hydroxide 30-hydrate represented by the following Formula 2d, diethyl dimethyl ammonium hydroxide, ethyltrimethylammonium hydroxide, and trimethylphenylammonium hydroxide.

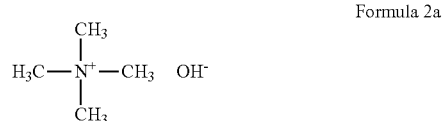

Formula 2a

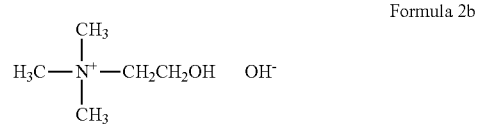

Formula 2b

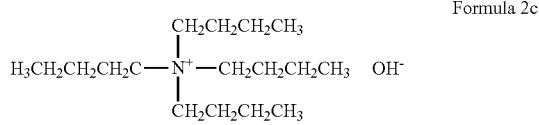

Formula 2c

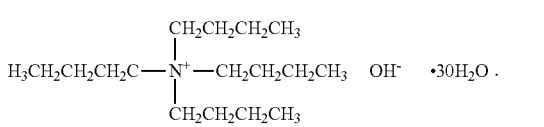

Formula 2d

In the formulae of the present specification, the expression "alkyl" denotes fully saturated branched or unbranched (or straight or linear) hydrocarbon.

Non-limiting examples of the "alkyl" may include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

The expression "aryl" also includes a group in which an aromatic ring is fused to at least one carbon ring.

Non-limiting examples of the "aryl" may include phenyl, naphthyl, and tetrahydronaphthyl.

Also, at least one hydrogen atom of the "aryl" group may be substituted with a same substituent as those described above for alkyl group.

As the substituent, the substituted C1-C20 alkyl group and substituted C6-C20 aryl group may include a halogen atom, a halogen atom-substituted C1-C20 alkyl group (e.g., $CCF_3$, $CHCF_2$, $CH_2F$, $CCl_3$, etc.), C1-C20 alkoxy, C2-C20 alkoxyalkyl, a hydroxyl group, a nitro group, a cyano group, an amino group, an amidino group, hydrazine, hydrazone, a carboxyl group or a salt thereof, a sulfonyl group, a sulfamoyl group, a sulfonic acid group or a salt thereof, phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

Examples of the polar solvent may be polyvalent alcohol, a carbonate-based solvent, γ-butyrolactone, dimethylformamide, N-methylpyrrolidone, amide, polypyrrole, a molten salt, or a mixture thereof.

The polyhydric alcohol may include ethylene glycol, 1,2-propylene glycol, 1,3-propylene glycol, diethylene glycol, triethylene glycol, 1,2,3-propanetriol (glycerol), or a mixture thereof.

Examples of the carbonate-based solvent may be propylene carbonate, diethyl carbonate, and dimethyl carbonate.

The polar solvent may have a freezing point lower than that of water. For example, the polar solvent may have a freezing point of about −5° C. to about −100° C. Since the electrowetting device may not be operated when the fluid is solidified, a usable temperature range of the electrowetting device may largely depend on the freezing point of the fluid. Since a freezing point of the first fluid including the polar solvent may be lowered due to the decrease in the freezing point of the polar solvent, the operating temperature range of the electrowetting device may be broadened.

An amount of the polar solvent may be in a range of about 100 parts by weight to about 100,000 parts by weight based on 100 parts by weight of the organic acid having an acid dissociation constant (pKa) of about 4 or less.

A mixture including i) ethylene glycol and ii) at least one solvent selected from the group consisting of 1,3-propandiol, diethylene glycol, propylene glycol, and glycerol may be used as the polar solvent. Herein, an amount of the solvent may be in a range of about 5 parts by weight to about 50 parts by weight, for example, about 5 parts by weight to about 10 parts by weight, based on 100 parts by weight of a total amount of the ethylene glycol and solvent. When the polar solvent is used, the above-described polyhydric alcohol may act as a freezing point depressant, and thus, the electrowetting device may be operated at lower temperature. Therefore, the freezing point of the first fluid according to an embodiment of the present disclosure may be in a range of about −30° C. to about −60° C.

Next, an operating principle of the first fluid according to the embodiment of the present disclosure will be described with reference to more detailed examples. The first fluid includes a compound represented by the following Formula 1a and a compound represented by the following Formula 2a.

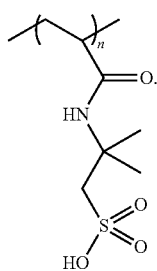

Formula 1a

In Formula 1a, n is between 1 and 1,000, for example, 1 and 10.

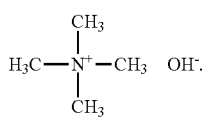

Formula 2a

A hydroxide ion (OH⁻) generated in tetramethylammonium hydroxide represented by Formula 2a is combined with a hydrogen ion (H⁺) of PAMPSA represented by Formula 1a to form water. A leakage current of the electrowetting device due to the diffusion of hydrogen ions into other parts may be reduced by minimizing the amount of hydrogen ions (H⁺) through such reaction. In this case, since tetramethylammonium ions may act as an electrolyte instead of hydrogen ions (H⁺), electrical conductivity of the first fluid may be well maintained. Also, since a size of the tetramethylammonium ion is significantly larger than a size of the hydrogen ion (H⁺), a leakage current due to the diffusion of the tetramethylammonium ions does not occur. Simultaneously, since a size of an anion is also significantly larger than that of a typical anion, the destruction of the dielectric layer due to the diffusion of the anion may be delayed.

An amount of the organic acid having a pKa of about 4 or less may be in a range of about 0.0001 part by weight to about 20 parts by weight, for example, about 0.001 part by weight to about 10 parts by weight, based on 100 parts by weight of a total weight of the first fluid. An amount of the quaternary ammonium hydroxide compound may be in a range of about 0.0001 part by weight to about 20 parts by weight, for example, about 0.001 part by weight to about 10 parts by weight, based on 100 parts by weight of the total weight of the first fluid. In a case where the amounts of the organic acid and the quaternary ammonium hydroxide compound are within the above ranges, excellent electrical conductivity may be maintained without compromising the surface tension of the first fluid.

The amount of the quaternary ammonium hydroxide compound may be in a range of about 1 mol to about 1.5 mol, for example, about 1 mol to about 1.2 mol, based on 1 mol of the organic acid having an acid dissociation constant (pKa) of about 4 or less. Since equivalent weights of the quaternary ammonium hydroxide compound and the organic acid having an acid dissociation constant of about 4 or less are used, hydroxide ions (OH⁻) of the quaternary ammonium hydroxide compound and hydrogen ions (H⁺) are neutralized to form water. The amount of the water thus formed is very small and the water may be removed using zeolite.

The rate of change of the surface tension of the first fluid according to changes in the amounts of the organic acid and the quaternary ammonium hydroxide compound may be between about 50% and about 200%. That is, when the surface tension of the first fluid at any amount ratio is set as a reference value, a variation range of the surface tension may be about 50% to about 200% based on the reference value in a case where the amounts of the organic acid and the quaternary ammonium hydroxide compound are changed within the above ranges.

The first fluid may have an electrical conductivity of about 10 μS/cm to about 10,000 μS/cm. Since the first fluid has the above range of electrical conductivity, the movement of the fluid may be adjusted by an applied voltage. The surface tension of the first fluid may be in a range of about 6 mN/m to about 12 mN/m. Since the first fluid has a low rate of change of the surface tension according to the changes in the amounts of the organic acid and the quaternary ammonium hydroxide compound, margins in the amounts of the organic acid and the quaternary ammonium hydroxide compound which may be adjusted to control the electrical conductivity of the first fluid are wide.

A nonionic surfactant may be further included in the first fluid. When the nonionic surfactant is further included, the viscosity and surface tension of the first fluid may be controlled within an appropriate range. Herein, an amount of the nonionic surfactant may be in a range of about 0.0001 mol to about 0.2 mol based on 1 mol of the organic acid having an acid dissociation constant (pKa) of about 4 or less.

The nonionic surfactant includes at least one selected from the group consisting of sorbitan monolaurate, sorbitan, monoisostearate, sorbitan monopalmitate, alcohol ethoxylate, alkylphenol ethoxylate, and compounds represented by the following Formula 3.

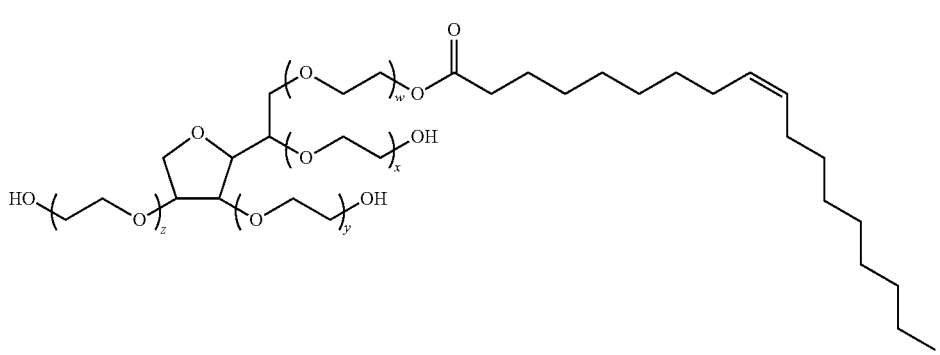

Formula 3

In the above formula, each of x, y, z, and w is a number between 1 and 10, and x+y+z+w=20.

Examples of the second fluid as a non-polar liquid constituting the fluid for an electrowetting device may include oil such as silicone oil, bromonaphtalene, chloronaphthalene, bromododecane, tetradecane, hexane, heptane, octane, nonane, decane, undecane, dodecane, tridecane, pentadecane, decalin, or a mixture thereof. The second fluid is non-conductive and has an electrical conductivity of less than about 0.001 μS/cm, for example, about 0.00001 μS/cm to about 0.001 μS/cm.

The fluids according embodiments of the present disclosure do not contain water.

Since the first fluid and the second fluid are immiscible and do not chemically react each other, the stability of the electrowetting device may be increased. Also, since components of the first fluid and the second fluid may not diffuse into other parts in the device, the stability of the device may be increased.

Viscosities of the first fluid and the second fluid may be greater than about 0 cP and equal to or less than about 10 cP. When the viscosities are within the above range, the reliability of the electrowetting device may be improved. The first fluid and the second fluid may each have a light transmittance of about 90% to about 100%. When the light transmittances are within the above range, the first fluid and the second fluid may be used in an optical device while minimizing optical loss.

Boiling points of the first fluid and the second fluid may be greater than about 80° C. When the boiling points are within the above range, the stability of a device, in which the first fluid is used, may be increased. The first fluid and the second fluid may be electrically stable when a voltage having an absolute value of about 100 V or less is applied.

A ratio of a density of the first fluid to a density of the second fluid may be in a range of about 1:0.8 to about 1:1.2. When the density ratio is within the above range, characteristics of the electrowetting device may be improved. The first fluid and the second fluid may have a wide contact angle of about 0° to about 170°. For example, the contact angle at the interface between the first fluid and the second fluid may be changed in a range of about 20° to about 160°.

In the fluid for an electrowetting device according to the embodiment of the present disclosure, components included in the fluid may be analyzed using analytical instruments such as a gas chromatography (GC) mass spectrometer and a high performance triple quadrupole mass spectrometer.

According to another aspect of the present disclosure, an electrowetting device according to an embodiment of the present disclosure is provided.

The electrowetting device includes a first electrode and a second electrode facing to each other; a dielectric layer on the first electrode and the second electrode; and the fluid for an electrowetting device according to the embodiment of the present disclosure which is disposed between the first electrode and the second electrode and is separated from the first electrode and the second electrode by the dielectric layer.

The fluid for an electrowetting device according to the embodiment of the present disclosure may be used in a liquid lens, a micropump, a display apparatus, and an optical device.

FIG. 1 is a cross-sectional view schematically illustrating a structure of a single electrowetting prism cell of an electrowetting device according to an embodiment of the present disclosure.

Referring to FIG. 1, an electrowetting prism cell 100 may include a lower substrate 101 and an upper substrate 111 which are disposed with a space therebetween and faced to each other, partition walls 102 defining the cell 100, a first electrode 103a and a second electrode 103b respectively disposed on both sidewalls of the partition wall 102, a dielectric layer 104 formed to completely cover the first and second electrodes 103a and 103b, a hydrophobic coating 105 formed to completely cover the dielectric layer 104, first and second wirings 106a and 106b which are disposed on a top surface of the lower substrate 101 so as to be respectively electrically connected to the first and second electrodes 103a and 103b, a passivation layer 107, a common electrode 110 disposed on a bottom surface of the upper substrate 111, and a non-polar liquid 108 and a polar liquid 109 which are disposed in a space surrounded by the partition walls 102. Herein, the non-polar liquid and the polar liquid constituting the fluid for an electrowetting device according to the embodiment of the present disclosure are respectively used as the non-polar liquid 108 and the polar liquid 109.

The lower substrate 101 and the upper substrate 111 may be formed of a transparent material through which light may be transmitted. For example, the lower substrate 101 and the upper substrate 111 may be formed of a material such as transparent glass and plastics.

The partition walls 102 act to define the prism cell 100, and for example, may be formed by patterning a photoresist, silicon oxide, and silicon nitride. It is illustrated in the cross-sectional view of FIG. 1 that the two partition walls 102 are disposed, but the partition walls 102 may actually be a single structure constructed in the form of a mesh or net so as to form a plurality of spaces in the inside thereof such as a lattice structure. As illustrated in FIG. 1, the first electrode 103a and the second electrode 103b may be arranged to face each other by having a space formed by the partition walls 102 therebetween.

The first electrode 103a and the second electrode 103b may be formed of a transparent conductive material. For example, the first electrode 103a and the second electrode 103b may be formed of a transparent conductive material such as a conductive metal oxide, such as indium tin oxide (ITO), ZnO:aluminum (Al), ZnO:gallium (Ga), and $SnO_2$:fluorine (F), a conductive polymer, and carbon nanotubes (CNT), but the present disclosure is not limited thereto.

Figure 2A:
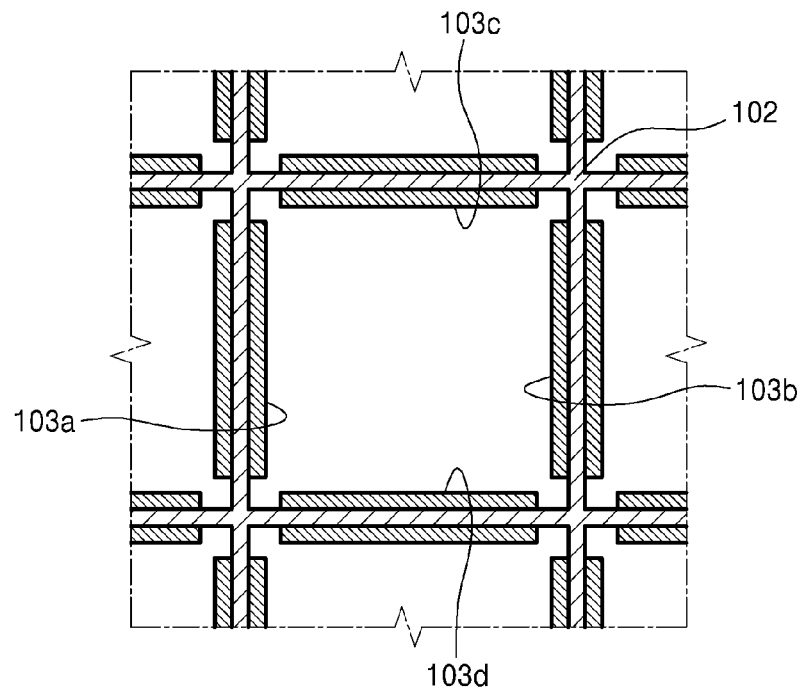
FIG. 2A is a conceptual view schematically illustrating the arrangement of a prism cell according to an embodiment of the present disclosure.

FIG. 2A is a conceptual view schematically illustrating the arrangement of the prism cell 100 according to an embodiment of the present disclosure.

Referring to FIG. 2A, the partition walls 102 may have the form of a mesh so as to form a plurality of space having a diamond shape according to the arrangement of the prism cell 100, and each of the two electrodes 103a and 103b may be disposed in each space. For example, the first electrode 103a may be disposed along two adjacent sidewalls on the left side of the partition wall 102 and the second electrode 103b may be disposed along the remaining two adjacent sidewalls on the right side of the partition wall 102 so as to face the first electrode 103a. Accordingly, the center of the first electrode 103a may be bent in a "<" shape, and the center of the second electrode 103b may be bent in a ">" shape, an inverted form thereof.

Figure 2B:
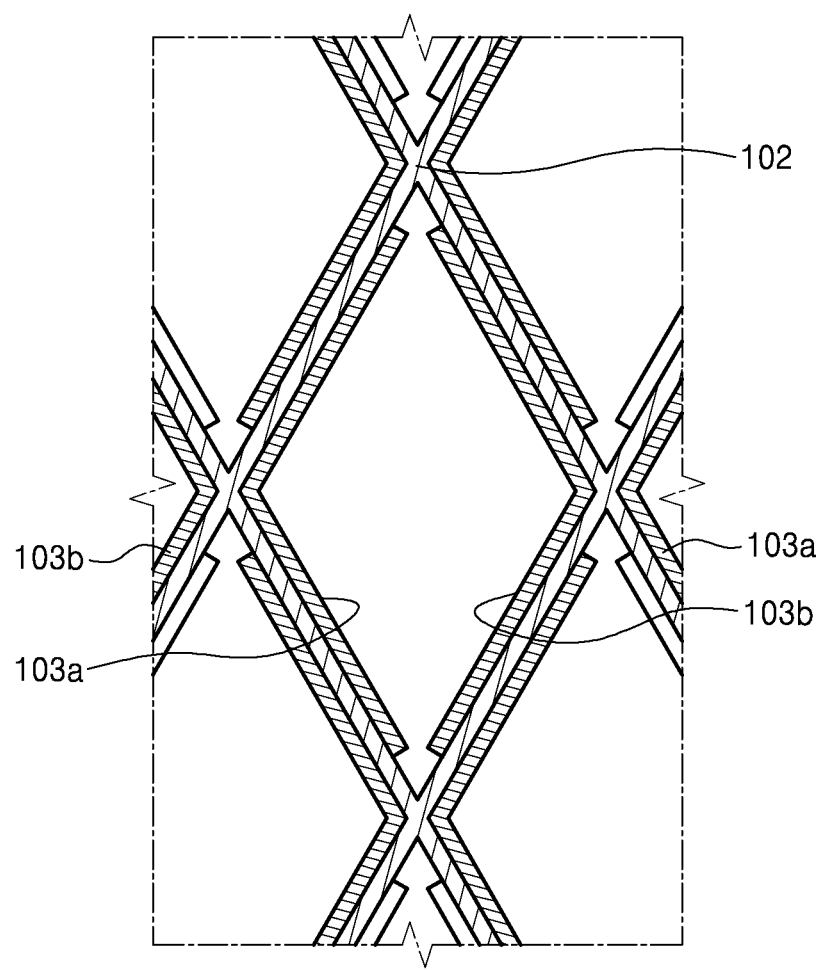
FIG. 2B is a conceptual view schematically illustrating the arrangement of the prism cell according to another embodiment of the present disclosure.

A planar form of the prism cell 100 may have various shapes, such as rectangular, in addition to a qaudrilateral shape such as a diamond (rhombus) shape, and in this case, the first and second electrodes 103a and 103b may be separated without bending. FIG. 2B is a conceptual view schematically illustrating the arrangement of the prism cell 100 according to another embodiment of the present disclosure. As illustrated in FIG. 2B, the partition wall 102 may have the form of a mesh so as to form, for example, a rhombic, square, rectangular, parallelogrammic lattice structure, and four electrodes 103a to 103d may be disposed in each space. That is, the first electrode 103a and the second electrode 103b are disposed on the partition walls 102 along a first direction so as to face to each other, and the third electrode 103c and the fourth electrode 103d are disposed on the partition walls 102 along a second direction perpendicular to the first direction so as to face to each other.

The dielectric layer 104 formed to cover the first and second electrodes 103a and 103b acts to electrically insulate the liquids 108 and 109 in the space from the first and second electrodes 103a and 103b. The dielectric layer 104 may be formed of silicon oxide, silicon nitride, alumina, or perylene, but the present disclosure is not limited thereto. The dielectric layer 104 may be formed to extend to the bottom of the space while completely covering the first and second electrodes 103a and 103b. Also, the hydrophobic coating 105 formed along the surface of the dielectric layer 104 may allow the polar liquid 109 to easily form a predetermined contact angle at an interface with the non-polar liquid 108. The hydrophobic coating 105, for example, may include poly(tetrafluoroethylene), poly(trifluoroethylene), or poly(difluoroethylene), but the present disclosure is not limited thereto. The hydrophobic coating 105 may also be formed to extend to the bottom of the space while completely covering the dielectric layer 104.

Figure 3:
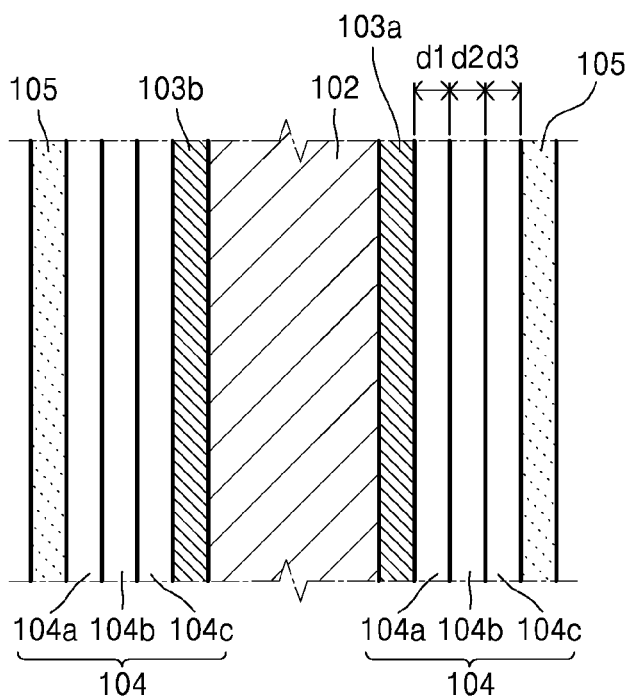
FIG. 3 is a cross-sectional view schematically illustrating an exemplary multilayer structure of a dielectric layer.

In order to withstand pressure due to the shaking of the liquids 108 and 109 and prevent reactions with the liquids 108 and 109, the dielectric layer 104 may have a multilayer structure formed of a plurality of different materials. For example, a cross-sectional view of FIG. 3 schematically illustrates an exemplary multilayer structure of the dielectric layer 104. Referring to FIG. 3, the dielectric layer 104, for example, may include a first layer 104a formed of an amorphous fluoropolymer such as CYTOP®, a second layer 104b formed of $HfO_2$, and a third layer 104c formed of molybdenum (Mo) in a sequence near the electrodes 103a and 103b. Herein, for example, a thickness d1 of the first layer 104a may be about 100 Å, a thickness d2 of the second layer 104b may be about 2,000 Å, and a thickness d3 of the third layer 104c may be about 2,000 Å, but the present disclosure is not limited thereto.

The fluid for an electrowetting device disposed in the space formed by the partition walls 102 may be the fluid for an electrowetting device according to the embodiments of the present disclosure. As described above, the fluid for an electrowetting device includes the non-polar liquid 108 and the polar liquid 109.

The non-polar liquid 108 and the polar liquid 109 may have high transmittance so as to transmit light almost without loss and may have different refractive indices so as to reflect light at an interface therebetween. Also, as illustrated in FIG. 1, a density of the non-polar liquid 108 may be higher than a density of the polar liquid 109 so that the non-polar liquid 108 is disposed downward in the space.

Furthermore, as illustrated in FIG. 1, the non-polar liquid 108 disposed downward in the space formed by the partition walls 102 may be separately disposed in each electrowetting prism cell 100. In contrast, the polar liquid 109 disposed upward in the space may be disposed by extending as one piece to the entire electrowetting prism cells 100 in the electrowetting prism device so as each cell of the device is in fluid communication with other cells. For this purpose, a predetermined spacing may exist between the bottom surface of the upper transparent substrate 111 and the top surface of the partition wall 102.

The passivation layer 107 may be formed on the wirings 106a and 106b so that the wirings 106a and 106b may only be in contact with the electrodes 103a and 103b. The passivation layer 107 may be formed to cover the wirings 106a and 106b excluding portions connected to the electrodes 103a and 103b. In this case, the partition walls 102, the electrodes 103a and 103b, and the dielectric layer 104 may be formed on the passivation layer 107.

In the electrowetting prism cell 100 having the above-described structure, contact angles ($\theta_L$ and $\theta_R$, FIG. 1) between the partition wall 102 and the interface between the non-polar liquid 108 and the polar liquid 109 may be adjusted by voltages respectively applied to the two electrodes 103a and 103b. Thus, when the voltages respectively applied to the electrodes 103a and 103b are appropriately adjusted, the interface between the non-polar liquid 108 and the polar liquid 109 may be perpendicular to an optical axis or may be inclined with respect to the optical axis. For example, a predetermined voltage may be applied to the first electrode 103a so that the contact angles $\theta_L$ and $\theta_R$ are about 120° and about 60°, respectively. Then, the interface between the polar liquid 109 and the non-polar liquid 108 may be inclined at an angle of about 60° with respect to an optical axis OX as illustrated in FIG. 1. According to the above principle, the electrowetting prism cell 100 may change a propagation direction of incident light by reflecting the incident light at a desired angle.

As illustrated in FIG. 2A, the electrowetting prism device according to the embodiment of the present disclosure may include the plurality of electrowetting prism cells 100 that are two-dimensionally arranged in a rhombic lattice pattern. In the above electrowetting prism device, the electrowetting prism cells 100 may be coincidently operated or may be each independently operated. That is, all of the electrowetting prism cells 100 may be operated to have the same inclined angle of the interface, and the individual electrowetting prism cell 100 may be operated to have different contact angles $\theta_L$ and $\theta_R$ (FIG. 1). When all of the electrowetting prism cells 100 in the electrowetting prism device are to be coincidently operated, the wirings 106a and 106b may be directly connected to the electrodes 103a and 103b. For example, the first wiring 106a may be directly connected to the first electrode 103a, and the second wiring 106b may be directly connected to the second electrode 103b. In contrast, when the electrowetting prism cells 100 in the electrowetting prism device are to be each independently operated, a switching device may be disposed in each electrowetting prism cell 100.

When the above electrowetting device is used in a three-dimensional image display apparatus, brightness of the three-dimensional image display apparatus may be improved and power consumption may be reduced.

Figure 4:
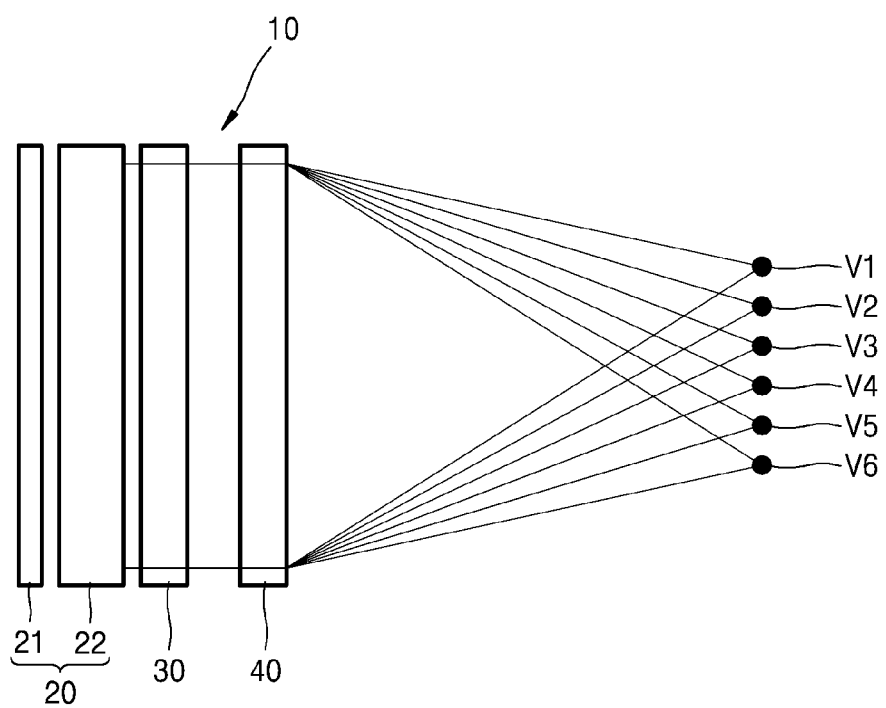
FIG. 4 is a conceptual view schematically illustrating a structure of a multi-view three-dimensional image display apparatus including the above-described electrowetting prism device according to an embodiment of the present disclosure.

FIG. 4 is a conceptual view schematically illustrating a structure of a multi-view three-dimensional image display apparatus including the above-described electrowetting device according to an embodiment of the present disclosure.

Referring to FIG. 4, a three-dimensional display apparatus 10 according to an embodiment of the present disclosure may include an image generation unit 20 for generating an image, and an electrowetting prism device 40 for changing a propagation path of light from the image generation unit 20. The three-dimensional display apparatus 10 may selectively further include a three-dimensional (3D) optical unit 30 for separating viewpoints between the image generation unit 20 and the electrowetting prism device 40.

The image generation unit 20 may include a light source 21 and a display panel 22 which forms an image using light from the light source 21. For example, the display panel 22 may include a liquid crystal display (LCD), a digital micromirror device (DMD), a liquid crystal on silicon (LCOS) or a spatial light modulator (SLM). Although FIG. 4 illustrates that the image generation unit 20 includes the separate light source 21, this is only an example and the present embodiment is not limited thereto. For example, the image generation unit 20 may also include a self-luminous type display panel, such as an organic light-emitting device (OLED) and a plasma display panel (PDP), which do not need a separate light source.

The electrowetting prism device 40 acts to construct an image from multiple viewpoints V1 to V6 by changing the propagation path of light. For example, the electrowetting prism device 40 may be composed of an array of the above-described electrowetting prism cells 100, and may provide a multi-viewpoint image in a time-division manner by electrically controlling the angle at which light is refracted.

Figure 5A:
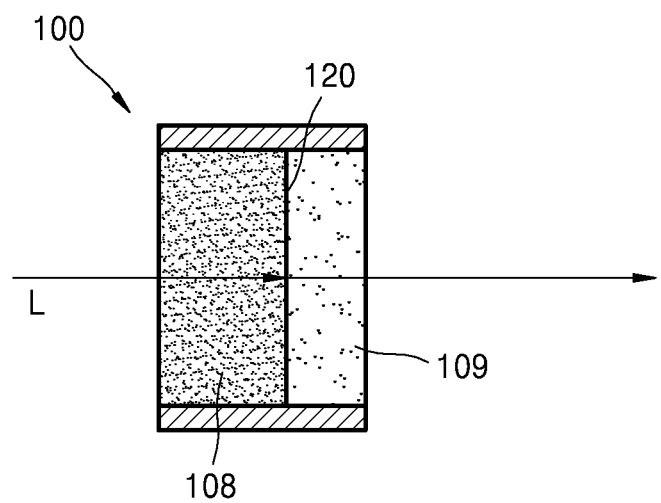
FIGS. 5A to 5C are conceptual views exemplarily illustrating an operation of a single prism cell of the multi-view three-dimensional image display apparatus illustrated in FIG. 4.
Figure 5B:
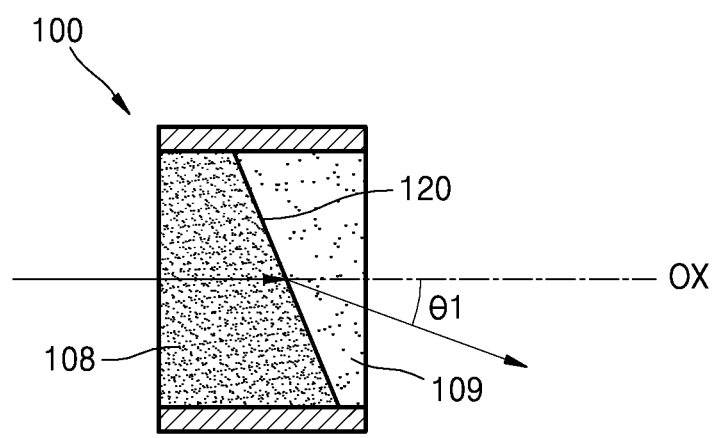
Figure 5C:
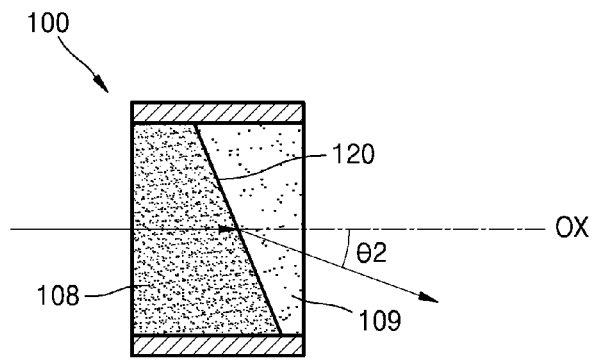

For example, as illustrated in FIG. 5A, when an interface 120 between the polar liquid 109 and the non-polarized liquid 108 is not inclined in the electrowetting prism cell 100 (i.e., $\theta_L=\theta_R=90°$), light L passes through the electrowetting prism cell 100 as it is without changes in the propagation path. As illustrated in FIG. 5B, when the interface 120 is inclined at a first angle by electrically controlling the electrowetting prism cell 100, the light passes through the electrowetting prism cell 100 by being refracted at the interface 120 by an angle of $+\Theta1$ with respect to the optical axis OX. Alternatively, as illustrated in FIG. 5C, when the interface 120 is inclined at a second angle by electrically controlling the electrowetting prism cell 100, the light passes through the electrowetting prism cell 100 by being refracted at the interface 120 by an angle of $-\Theta2$ with respect to the optical axis OX.

The image generation unit 20 may generate images from different viewpoints in a time sequence, and the plurality of electrowetting prism cells 100 in the electrowetting prism device 40 may be driven to reflect light including the images from different viewpoints at different angles by being synchronized with the image generation unit 20. For example, when the image from the first viewpoint is output by the image generation unit 20, the electrowetting prism cell 100 may be driven so that the interface is not inclined as illustrated in FIG. 5A. Also, when the image from the second viewpoint is output by the image generation unit 20, the electrowetting prism cell 100 may be driven so that the interface may be inclined at the first angle as illustrated in FIG. 5B. When the image from the third viewpoint is output by the image generation unit 20, the electrowetting prism cell 100 may be driven so that the interface is inclined at the second angle as illustrated in FIG. 5C. Images from more viewpoints may be displayed depending on a driving speed of the electrowetting prism cell 100 and a slope of the refracting surface.

The 3D optical unit 30, for example, may be an optical device capable of dividing viewing zones, such as a lenticular lens array, a micro lens array, or a parallax barrier. The 3D optical unit 30 may allow images output from the image generation unit 20 to be focused by dividing the images into the plurality of viewing zones. The technique of dividing viewing zones by the 3D optical unit 30 is already well known, and thus, the detailed description thereof will be omitted. According to the present embodiment, the number of viewpoints may be doubled by the 3D optical unit 30 and the electrowetting prism device 40. For example, when the 3D optical unit 30 divides an image into two viewpoints and the electrowetting prism device 40 divides the image into three viewpoints, images from a total of six viewpoints may be displayed. For example, since the electrowetting prism device 40 may control the angle of the interface in various ways according to electrical control, the number of viewpoints may be significantly increased by using the electrowetting prism device 40. Furthermore, since the electrowetting prism device 40 may change the viewpoint by converting the optical path of the image generated from the image generation unit 20, the number of viewpoints may be increased without deterioration of the resolution. Thus, the three-dimensional display apparatus 10 according to the present embodiment may realize a super multi-view 3D image without deterioration of the resolution.

The display panel 22 of the image generation unit 20 includes a plurality of color sub-pixels for displaying an image, and the display panel 22 may be configured such that the plurality of electrowetting prism cells 100 in the electrowetting prism device 40 are provided in a one-to-one correspondence with the plurality of color sub-pixels in the display panel 22. That is, as described above, in the case that the electrowetting prism cells 100 are arranged in a rhombic lattice pattern, the color sub-pixels of the display panel 22 may also be arranged in a rhombic lattice pattern. Alternatively, in a case where the electrowetting prism cells 100 are arranged in a rectangular lattice pattern, the color sub-pixels of the display panel 22 may also be arranged in a rectangular lattice pattern.

Exemplary embodiments of the electrowetting device and the multi-view 3D image display apparatus using the same have been described and shown in the accompanying drawings. However, it should be understood that such embodiments are merely intended to illustrate the present disclosure and not to limit the present disclosure. It should be also understood that the present disclosure is not limited to the illustrated and provided description. This is because various modifications may be made by those of ordinary skill in the art.

The present disclosure is described in more detail according to examples and comparative examples below. However, the examples only exemplify the present disclosure, and the scope of the present disclosure is not limited thereto.

Example 1: Preparation of Polar Liquid

Poly(2-acrylamido-2-methyl-1-propane sulfonic acid) (PAMPSA) (weight-average molecular weight of about 7,500, Polysciences Inc.) and tetramethylammonium hydroxide (TMAH, Sigma-Aldrich) with ethylene glycol (EG, Sigma-Aldrich) were mixed to prepare a polar liquid. In the polar liquid, an amount of the ethylene glycol was about 99.9 parts by weight, an amount of the PAMPSA was about 0.036 part by weight, and an amount of the TMAH was about 0.064 part by weight. Herein, an equivalence ratio of the PAMSA to the TMAH was about 1:1.

Example 2: Preparation of Polar Liquids

Polar liquids were prepared in the same manner as in Example 1 except that about 99 parts by weight of polar solvents respectively having mixing ratios listed in the following Table 1 were used instead of about 99 parts by weight of ethylene glycol.

TABLE 1

| Category | Amount of ethylene glycol (part by weight) | Amount of 1,3-propanediol (part by weight) |
| --- | --- | --- |
| 1 | 1 | 0 |
| 2 | 0.95 | 0.05 |
| 3 | 0.9 | 0.1 |
| 4 | 0.8 | 0.2 |
| 5 | 0.75 | 0.25 |
| 6 | 0.7 | 0.3 |
| 7 | 0.6 | 0.4 |
| 8 | 0.4 | 0.6 |
| 9 | 0.2 | 0.8 |
| 10 | 0 | 1 |

Example 3: Preparation of Polar Liquids

Polar liquids were prepared in the same manner as in Example 2 except that diethylene glycol was used instead of 1,3-propanediol.

Example 4: Preparation of Polar Liquids

Polar liquids were prepared in the same manner as in Example 2 except that propylene glycol was used instead of 1,3-propanediol.

Example 5: Preparation of Polar Liquids

Polar liquids were prepared in the same manner as in Example 2 except that glycerol was used instead of 1,3-propanediol.

Example 6: Preparation of Polar Liquids

As polar liquids with various molal concentrations, polar liquids respectively having a concentration of about 0.010970927 m, about 0.054854635 m, 0.10970927 m, 0.164563906 m, and 0.219418541 m were prepared by respectively dissolving polyvinylphosphonic acid (PVPA), polymethacrylic acid (PMA), and polystyrene sulfonic acid (PSSA) in about 1 kg of ethylene glycol.

Examples 7 to 9: Preparation of Polar Liquids

Polar liquids were prepared in the same manner as in Example 1 except that choline hydroxide, tetrabutylammonium hydroxide (TBAH), and tetrabutylammonium hydroxide 30-hydrate (TBAHh) were respectively used instead of TMAH.

Example 10: Preparation of Polar Liquid

A polar liquid was prepared in the same manner as in Example 1 except that the amount of PAMSA was changed to about 0.05 part by weight based on 100 parts by weight of a total weight of the polar liquid.

In the polar liquid obtained according to Example 10, an amount of ethylene glycol was about 99.928 parts by weight and an amount of TMAH was about 0.022 part by weight based on the total weight of the polar liquid. An equivalence ratio of the PAMSA to the TMAH was about 1:1.

Example 11: Preparation of Polar Liquid

A polar liquid was prepared in the same manner as in Example 1 except that the amount of PAMSA was changed to about 0.1 part by weight based on 100 parts by weight of a total weight of the polar liquid.

In the polar liquid obtained according to Example 11, an amount of ethylene glycol was about 99.856 parts by weight and an amount of TMAH was about 0.044 part by weight based on the total weight of the polar liquid. An equivalence ratio of the PAMSA to the TMAH was about 1:1.

Example 12: Preparation of Polar Liquid

A polar liquid was prepared in the same manner as in Example 1 except that the amount of PAMSA was changed to about 0.2 part by weight based on 100 parts by weight of a total weight of the polar liquid.

In the polar liquid obtained according to Example 12, an amount of ethylene glycol was about 99.712 parts by weight and an amount of TMAH was about 0.05 part by weight based on the total weight of the polar liquid. An equivalence ratio of the PAMSA to the TMAH was about 1:1.

Comparative Example 1: Preparation of Polar Liquid

A polar liquid was prepared by mixing polyacrylic acid and water at a weight ratio of about 1:1.

Comparative Example 2: Preparation of Polar Liquid

A polar liquid was prepared by mixing about 0.01 part by weight of polyacrylic acid with about 99.99 parts by weight of ethylene glycol.

Comparative Example 3: Preparation of Polar Liquid

A polar liquid was prepared by mixing about 0.85 part by weight of polyacrylic acid with about 99.15 parts by weight of ethylene glycol.

Evaluation Example 1: Freezing Point of Polar Liquid

Examples 2 to 5 were examples in which the composition of polyhydric alcohol was changed. Freezing points of the polar liquids prepared according to Examples 2 to 5 were measured.

Figure 6:
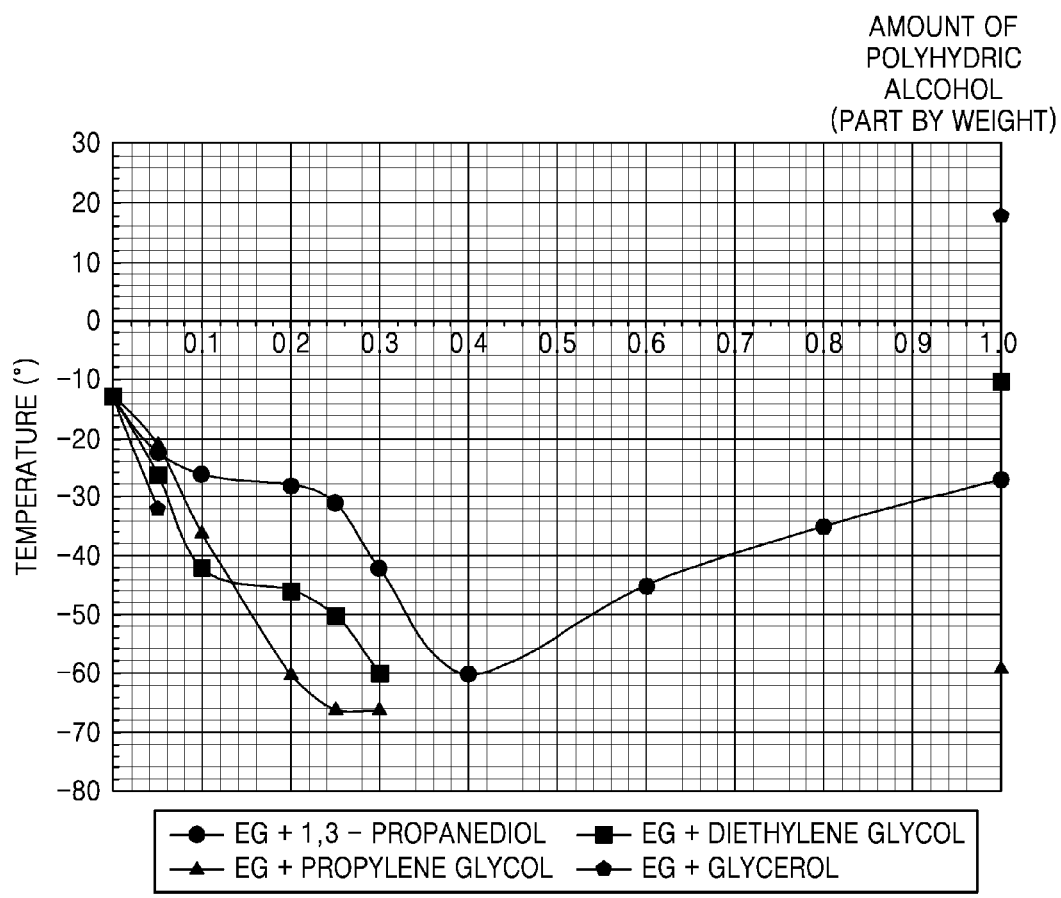
FIG. 6 illustrates measurement results of freezing points of polar liquids prepared according to Examples 2 to 5.

The results of measuring the freezing points are presented in FIG. 6.

Referring to FIG. 6, deionized water had a freezing point of about 0° C. or less. In contrast, the freezing point of the above-described polar solvent may be decreased to about −12° C. to about −65° C. according to the mixing ratio of ethylene glycol and polyvalent alcohol. Thus, when the polar liquids of Examples 2 to 5 were used, the freezing point of the polar liquid may be deceased without water.

Evaluation Example 2: Electrical Conductivity

1) Example 1

Electrical conductivity of the polar liquids of Example 1 was measured using a conductivity meter (conductivity pro meter, TRANS instruments).

Figure 7:
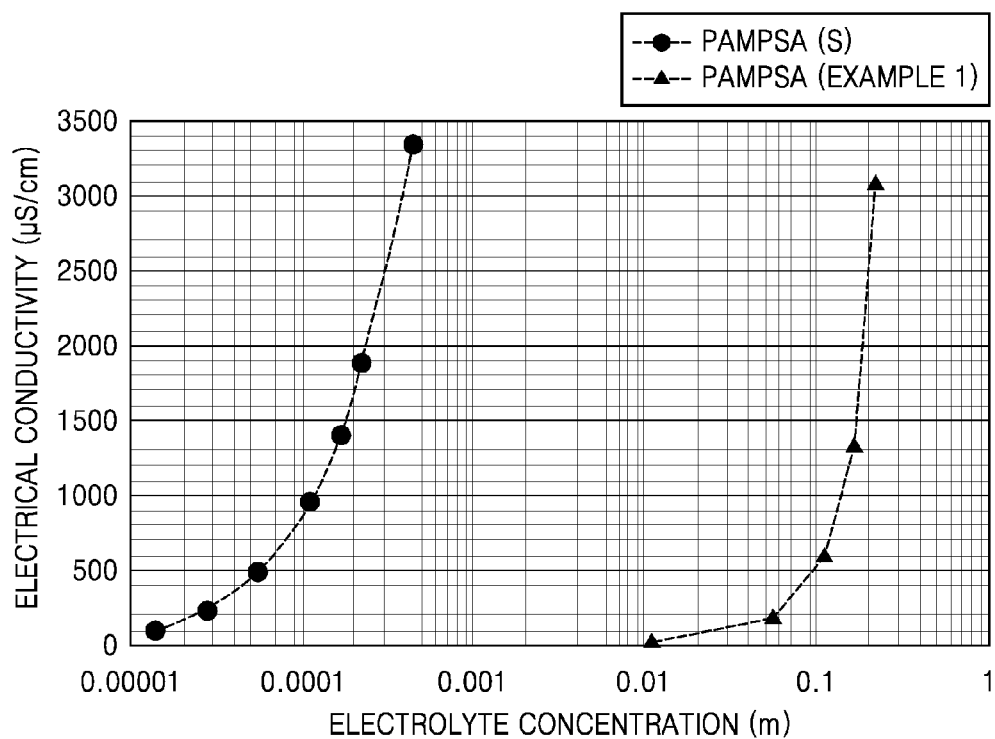
FIG. 7 illustrates electrical conductivity of a polar liquid of Example 1.

The results of measuring the electrical conductivity are presented in FIG. 7. In FIG. 7, the legend "PAMPSA (S)" denotes the electrical conductivity of solid-state PAMPAS, and the legend "PAMSA (Example 1) denotes the electrical conductivity of the polar liquid of Example 1.

As illustrated in FIG. 7, it may be understood that the electrical conductivities of the solid-state PAMPSA and the polar liquid prepared according to Example 1 were excellent.

2) Example 6

Figure 8:
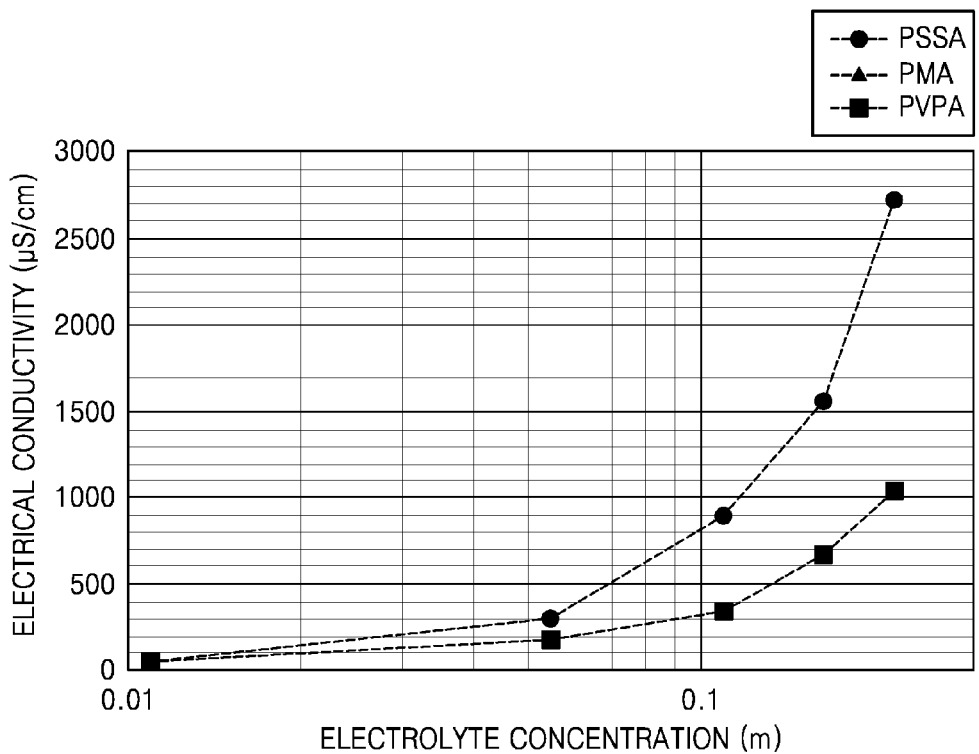
FIG. 8 illustrates electrical conductivities of polar liquids prepared according to Example 7 and Comparative Example 2.

Electrical conductivities of the polar liquids prepared according to Example 6 were measured using a conductivity meter (conductivity pro meter, TRANS instruments), and the results thereof are presented in FIG. 8.

Referring to FIG. 8, the electrical conductivity of the polar liquid using PSSA was lower than that of the polar liquid using PAMPSA, but the polar liquid using PSSA exhibited excellent electrical conductivity properties in a low concentration range. Hence, it may be understood that both PSSA and PAMPSA were useful as an electrolyte.

3) Examples 1 and 7 to 9

Figure 9:
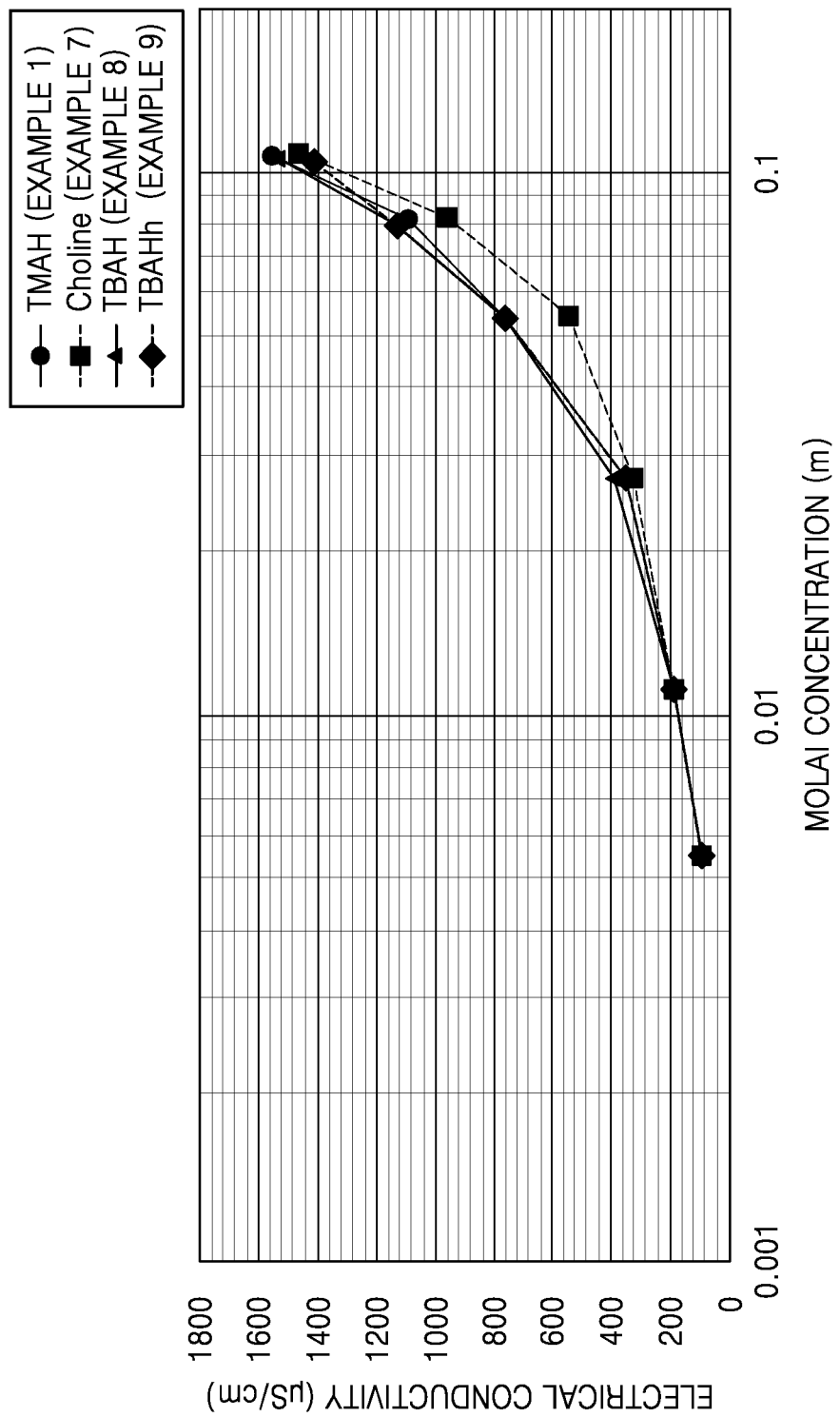
FIG. 9 illustrates electrical conductivities of polar liquids prepared according to Examples 1 and 7 to 9.

Electrical conductivities of the polar liquids prepared according to Examples 1 and 7 to 9 were measured, and the results thereof are presented in FIG. 9. In FIG. 9, the legend "TMAH" denotes Example 1, the legend "Choline" denotes Example 7, the legend "TBAH" denotes Example 8, and the legend "TBAH" denotes Example 9.

Referring to FIG. 9, as a result of investigating the effect of the length of an alkyl chain in the quaternary ammonium hydroxide compound on the electrical conductivity of the polar liquid, it may be understood that the effect was not significant. However, since the possibility of being dissolved in an oil phase may be increased when the length of the alkyl chain in the quaternary ammonium hydroxide compound was increased and an improvement of the electrical conductivity according to the length of the alkyl chain in the quaternary ammonium hydroxide compound was not observed as described above, tetramethylammonium hydroxide was used as the quaternary ammonium hydroxide compound.

4) Examples 10 to 12 and Comparative Example 3

Electrical conductivities of the polar liquids prepared according to Examples 10 to 12 and Comparative Example 3 were measured, and the results thereof are presented in Table 2 below.

TABLE 2

| | PAMPSA (part by weight) | PAA (part by weight) | Electrical conductivity (μS/cm) |
|---|---|---|---|
| Example 10 | 0.05 | — | 330 |
| Example 11 | 0.1 | — | 770 |
| Example 12 | 0.2 | — | 1642 |
| Comparative Example 3 | — | 0.85 | 649.67 |

Referring to Table 2, it may be understood that the electrical conductivity was excellent even in the case in which PAMPSA was used in a smaller amount than PAA.

Since the polyacrylic acid used during the preparation of the polar liquid of Comparative Example 3 had a high pKa, functional groups capable of giving off hydrogen ions when being dissolved in water did not dissociate all hydrogen ions. In contrast, since the polar liquids according to Examples 10 to 12 had a lower pKa than PAA, the polar liquids according to Examples 10 to 12 exhibited high electrical conductivity properties even if the polar liquids were used in a smaller amount than PAA. Thus, when the polar liquids of Examples 10 to 12 were used, the electrical conductivity was significantly improved in comparison to Comparative Example 3 due to the effect of changing to an ion having a size larger than a hydrogen ion.

5) Example 6

Electrical conductivities of the polar liquids prepared according to Example 6 were measured, and the results thereof are presented in Table 3 below.

TABLE 3

| Concentration of polar liquid (molal concentration, m) | Electrical conductivity (μS/cm) | | |
|---|---|---|---|
| | PSSA | PMA | PVPA |
| 0 | 2.3 | 2.3 | 2.3 |
| 0.010970927 | 47.5 | 321.0 | 41.4 |
| 0.054854635 | 304 | — | 186 |
| 0.10970927 | 896 | — | 344 |
| 0.164563906 | 1560 | — | 674 |
| 0.219418541 | 2720 | — | 1041 |

Evaluation Example 3: Viscosity, Surface Tension, and Visible-Light Absorption Properties Viscosities, surface tensions, and light transmittances for visible light of the polar liquids prepared according to Examples 10 to 12 and Comparative Example 3 were measured according to the following methods.

(1) Viscosity

Viscosities were measured using a viscometer (DV-II PLUS Pro Viscometer).

(2) Surface Tension

Measurements of the surface tensions of the polar liquids were made every 100 seconds from about 100 seconds to about 1,000 seconds using a tentiometer, and their average values are presented in Table 4 below.

(3) Light Transmittance

Light transmittance was investigated by the irradiation of light having a visible light wavelength of about 430 nm to about 680 nm using an ultraviolet-visible (UV-Vis) spectrometer. The results of measuring the light transmittance are presented in Table 4 below.

TABLE 4

| Category | PAMPSA (part by weight) | PAA (part by weight) | Surface tension (dyne/cm) | Viscosity (cP) | Light transmittance |
|---|---|---|---|---|---|
| Example 10 | 0.05 | — | 70.1 | 4.39 | 0 |
| Example 11 | 0.1 | — | 58.1 | 6.77 | 0 |
| Example 12 | 0.2 | — | 56.3 | 10.13 | 0 |
| Comparative Example 3 | — | 0.85 | 55.7 | 0.96 | — |

As illustrated in Table 4, it may be confirmed that the polar liquids prepared according to Examples 10 to 12 had characteristics of not absorbing visible light. It may be understood that the polar liquids prepared according to Examples 10 to 12 had higher viscosity and almost the same level of surface tension in comparison to the polar liquid prepared according to Comparative Example 3.

The viscosities of the polar liquids according to Examples 10 to 12 may be adjusted within an appropriate range by adjusting the weight-average molecular weight of the PAM-PSA.

Evaluation Example 4: High Temperature Reliability 9 cells were respectively prepared using the polar liquids that were prepared according to Example 1 and Comparative Example 1. Each cell was formed by dropping a drop of the polar liquid on the surface of an aluminium electrode coated with a dielectric layer.

Capacitance according to time was evaluated for each electrowetting cell using a reliability tester. The reliability tester was composed of a part for applying a voltage and a device for constantly maintaining the temperature of a system. The voltage was applied using a LCR meter and the temperature was maintained using a water bath. In the water bath, a height detection sensor was attached to constantly maintain a water level so that water was automatically supplied when the water level dropped. In the evaluation method, changes in the capacitance were examined by applying a voltage of about 20 V and an alternating current voltage with a frequency of about 1.5 KHz to each cell.

Figure 10:
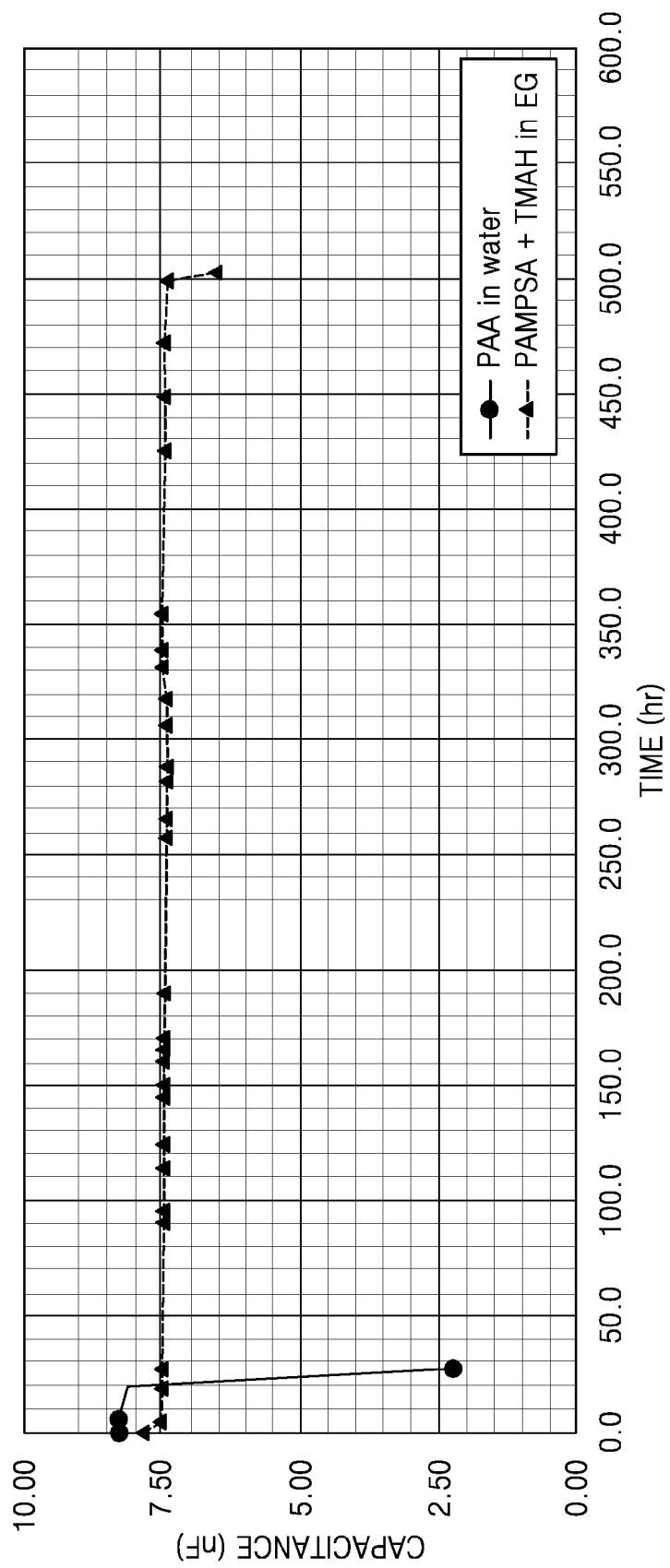
FIG. 10 illustrates the results of high temperature reliability evaluation of cells fabricated using polar liquids that are prepared according to Example 1 and Comparative Example 1.

The measurement results are presented in FIG. 10.

Referring to FIG. 10, with respect to the cell using the polar liquid prepared according to Comparative Example 1, it may be understood that since the dielectric layer (insulation layer) was very quickly damaged by the generation of a large amount of $H^+$ ions due to water, the average lifespan of the cell was very short at about 50 hours or less.

In contrast, with respect to the cell using the polar liquid prepared according to Example 1, the stability of the cell was maintained up to about 508 hours at 60° C. Thus, it may be understood that the high temperature reliability was improved in comparison to the case of Comparative Example 1 when the polar liquid according to Example 1 was used.

As described above, according to the one or more of the above embodiments of the present disclosure, when a fluid for an electrowetting device according to an embodiment of the present disclosure is used, the penetration destruction of an electrode (dielectric layer) caused by the diffusion of components of a fluid layer into the electrode (dielectric layer) may be prevented. As a result, an electrowetting device having improved stability and durability may be fabricated.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A fluid for an electrowetting device, the fluid comprising:
   a first fluid; and
   a second fluid immiscible with the first fluid,
   wherein the first fluid is a polar liquid and comprises an organic acid having an acid dissociation constant of about 4 or less, a polar solvent, and a quaternary ammonium hydroxide compound, and
   the second fluid is a non-polar solution, wherein the organic acid having an acid dissociation constant of about 4 or less comprises at least one selected from the group consisting of a compound of Formula 1, polyvinylphosphonic acid, polymethacrylic acid, and polystyrene sulfonic acid:

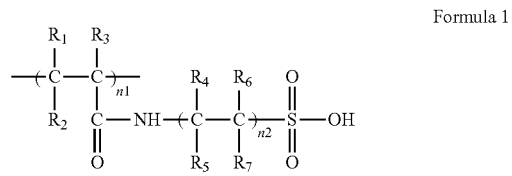

Formula 1 wherein, $R_1$ to $R_7$ are each independently a hydrogen atom, an unsubstituted or substituted C1-C20 alkyl group, or an unsubstituted or substituted C6-C20 aryl group, and n1 is selected from 1 to 1,000, and n2 is selected from 1 to 4.

2. The fluid of claim 1, wherein the compound of Formula 1 comprises at least one selected from the group consisting of poly(2-acrylamido-2-methyl-1-propane sulfonic acid) of Formula 1a, a compound of Formula 1 b, and a compound of Formula 1c:

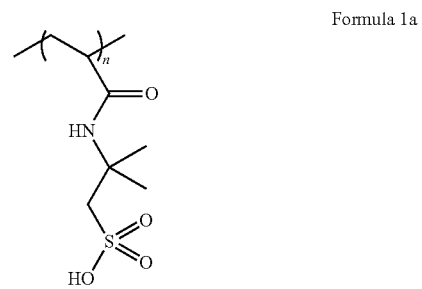

Formula 1a wherein n is selected from 1 to 1,000,

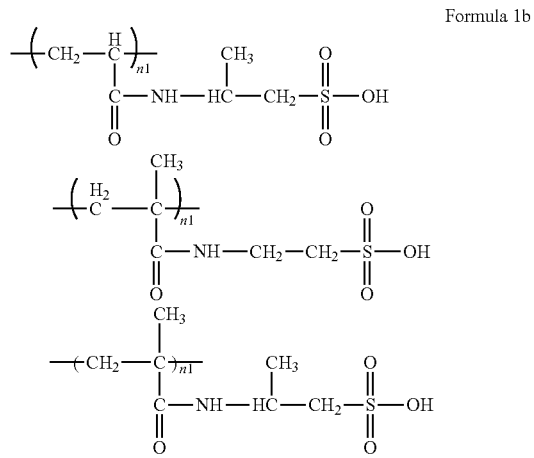

Formula 1b

-continued

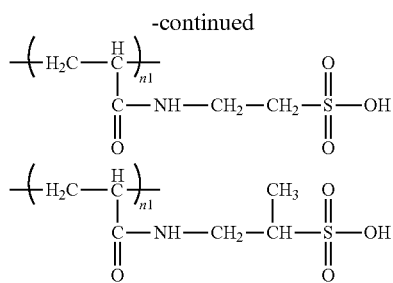

wherein n1 is selected from 1 to 1,000, and

Formula 1c

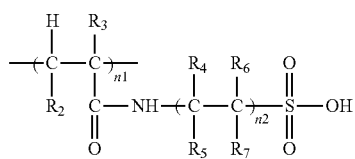

wherein n1 is selected from 1 to 1,000,
n2 is selected from 1 to 4, and
$R_3$, $R_4$, and $R_6$ are each independently H, $CH_3$, or $C_2H_5$.

3. The fluid of claim 1, wherein the quaternary ammonium hydroxide compound is a compound of Formula 2:

Formula 2

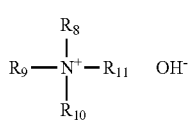

wherein at least one of $R_8$ to $R_{11}$ is an unsubstituted or substituted C1-C20 alkyl group, or an unsubstituted or substituted C6-C20 aryl group, and remaining $R_8$ to $R_{11}$ are each independently a hydrogen atom, an unsubstituted or substituted C1-C20 alkyl group, or an unsubstituted or substituted C6-C20 aryl group.

4. The fluid of claim 1, wherein the quaternary ammonium hydroxide compound comprises at least one selected from the group consisting of tetramethylammonium hydroxide, tetraethylammonium hydroxide, choline hydroxide, tetrabutylammonium hydroxide, tetrabutylammonium hydroxide 30-hydrate, diethyl dimethyl ammonium hydroxide, ethyltrimethylammonium hydroxide, and trimethylphenylammonium hydroxide.

5. The fluid of claim 1, wherein an amount of the quaternary ammonium hydroxide compound is in a range of about 1 mol to about 1.5 mol based on 1 mol of the organic acid having an acid dissociation constant of about 4 or less.

6. The fluid of claim 1, wherein the polar solvent is selected from the group consisting of a polyhydric alcohol, a carbonate-based solvent, γ-butyrolactone, dimethylformamide, N-methylpyrrolidone, and a mixture thereof.

7. The fluid of claim 6, wherein the polyhydric alcohol is selected from the group consisting of ethylene glycol, 1,2-propylene glycol, 1,3-propylene glycol, diethylene glycol, triethylene glycol, 1,2,3-propanetriol, and a mixture thereof.

8. The fluid of claim 1, wherein an amount of the polar solvent is in a range of about 100 parts by weight to about 100,000 parts by weight based on 100 parts by weight of the organic acid having an acid dissociation constant of about 4 or less.

9. The fluid of claim 1, further comprising a nonionic surfactant.

10. The fluid of claim 1, wherein the second fluid comprises oil.

11. The fluid of claim 1, wherein an amount of the organic acid having an acid dissociation constant of about 4 or less is in a range of about 0.0001 part by weight to about 20 parts by weight based on 100 parts by weight of a total weight of the first fluid.

12. The fluid of claim 1, wherein an amount of the quaternary ammonium hydroxide compound is in a range of about 0.0001 part by weight to about 20 parts by weight based on 100 parts by weight of a total weight of the first fluid.

13. The fluid of claim 1, wherein the first fluid has an electrical conductivity of about 10 μS/cm to about 10,000 μS/cm.

14. The fluid of claim 1, wherein a freezing point of the first fluid is in a range of about −5° C. to about −100° C.

15. The fluid of claim 1, wherein the first fluid and the second fluid each have a light transmittance of about 90% to about 100%.

16. The fluid of claim 1, which does not contain water.

17. An electrowetting device comprising:
a first electrode and a second electrode facing to each other;
a dielectric layer on the first electrode and the second electrode; and
a fluid disposed between the first electrode and the second electrode and is separated from the first electrode and the second electrode by the dielectric layer,
wherein the fluid is the fluid of claim 1 and the first fluid and the second fluid are separated from each other by an interface.

* * * * *